United States Patent
Lin et al.

(10) Patent No.: US 10,313,301 B1
(45) Date of Patent: Jun. 4, 2019

(54) INTELLECTUAL RACK AND IP ADDRESSES MANAGING METHOD THEREOF

(71) Applicant: AIC INC., Taoyuan (TW)

(72) Inventors: Wei-Cheng Lin, Taoyuan (TW); Po-Sheng Hsin, Taoyuan (TW); Cheng-Han Lin, Taoyuan (TW)

(73) Assignee: AIC INC., Taoyuan (TW)

( * ) Notice: Subject to any disclaimer, the term of this patent is extended or adjusted under 35 U.S.C. 154(b) by 0 days.

(21) Appl. No.: 15/926,687

(22) Filed: Mar. 20, 2018

(51) Int. Cl.
*H04L 29/12* (2006.01)
*G06F 13/40* (2006.01)

(52) U.S. Cl.
CPC ........ *H04L 61/255* (2013.01); *G06F 13/4068* (2013.01); *H04L 61/2007* (2013.01); *H04L 61/6018* (2013.01)

(58) Field of Classification Search
CPC ............... H04L 61/255; H04L 61/2007; H04L 61/6018; G06F 13/4068
See application file for complete search history.

(56) References Cited

U.S. PATENT DOCUMENTS

| 5,490,252 A | 2/1996 | Macera et al. | |
|---|---|---|---|
| 2016/0072761 A1* | 3/2016 | Shih | H04L 61/2015 709/220 |

FOREIGN PATENT DOCUMENTS

| CN | 101946258 A | 1/2011 |
|---|---|---|
| CN | 103092735 A | 5/2013 |
| TW | 201611559 A | 3/2016 |
| TW | 201740791 A | 11/2017 |

OTHER PUBLICATIONS

Office Action dated Aug. 14, 2018 of the corresponding Taiwan patent application.

* cited by examiner

*Primary Examiner* — Siming Liu
(74) *Attorney, Agent, or Firm* — Chun-Ming Shih; HDLS IPR Services (57) ABSTRACT

An intellectual rack includes a rack management system, a rack management controller (RMC), a set of internal hardware lines, a plurality of server slots, and multiple servers respectively arranged in the server slots. The RMC is connected with each baseboard management controller (BMC) of each server through the set of internal hardware lines. The rack management system determines whether a server is replaced through the RMC and the set of internal hardwire lines, and confirms a target server slot of the replacing action when determining that one of the servers is replaced. Further, the rack management system assigns an IP address binding to the target server slot for the BMC of the newly-replaced server to replace an IP address currently used by the BMC of the newly-replaced server, so as to keep the binding effect among the target server slot, the newly-replaced server and the IP address.

10 Claims, 7 Drawing Sheets

INTELLECTUAL RACK AND IP ADDRESSES MANAGING METHOD THEREOF

BACKGROUND OF THE INVENTION

1. Field of the Invention

The invention relates to an intellectual rack, and in particularly to an intellectual rack and an IP addresses managing method for the intellectual rack.

2. Description of Prior Art

A data center is usually arranged with multiple racks, each of the racks is respectively arranged with multiple servers.

For simultaneously managing the multiple racks in the data center, a management staff needs to assign an IP address to each rack management controller (RMC) in each of the racks, and also needs to assign an IP address to each baseboard management controller (BMC) in each of the servers. Therefore, the management staff may operate a terminal apparatus for connecting with each RMC of each of the racks and each BMC of each of the server by using the assigned IP addresses, so as to manage the data center at a remote end.

The servers arranged in the data center need to keep working, that is why the aging and damaging phenomenon are inevitable. Every time a server in any rack has replaced, the management staff needs to re-assign a new IP address to a newly-replaced server for the sake of aforementioned management. When the amount of the racks and the servers in the data center grows, it also increases the work load of the management staff in manually assigning the IP addresses, and raises the probably failure due to the manually operations.

Besides, in a data center, the amount and range of assignable IP addresses are definitely limited and restricted, if every RMC in the racks and every BMC in the servers are all needing an IP address, the overall maintenance and protection for all of the IP addresses will be very difficult and complicated for the management staff to achieve.

SUMMARY OF THE INVENTION

The object of the present invention is to provide an intellectual rack and an IP addresses managing method for the intellectual rack, which may keep the binding effect among the server slots, the servers and the IP addresses in each rack, so as to accomplish the overall maintenance and protection for all of the IP addresses of all racks and servers in the data center.

In one of the exemplary embodiments of the present invention, the intellectual rack includes: a rack management system, a rack management controller (RMC), a set of internal hardware lines, a plurality of server slots, and a plurality of servers respectively arranged in each of the server slots, wherein the RMC connects with a baseboard management controller (BMC) in each of the servers arranged in each of the server slots through the set of internal hardware lines. The rack management system determines whether any of the servers has been replaced through the RMC and the set of internal hardware lines, and confirms a target sever slot of a replacing action when determining that one of the servers has been replaced by a new server. Also, the rack management system assigns an IP address binding to the target server slot to the BMC of a new server for replacing another IP address currently used by the BMC of the new server.

When a new server is inserted into an unoccupied server slot of a rack, or a server in any server slot of the rack is replaced by the new server, the rack of the present invention may automatically assign a corresponding IP address to a BMC of the newly inserted/replaced server. Therefore, the work load of a management staff in manually assigning an IP address to the BMC of the newly inserted/replaced server is released, and turns out the probably failures due to manual operations is also reduced.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
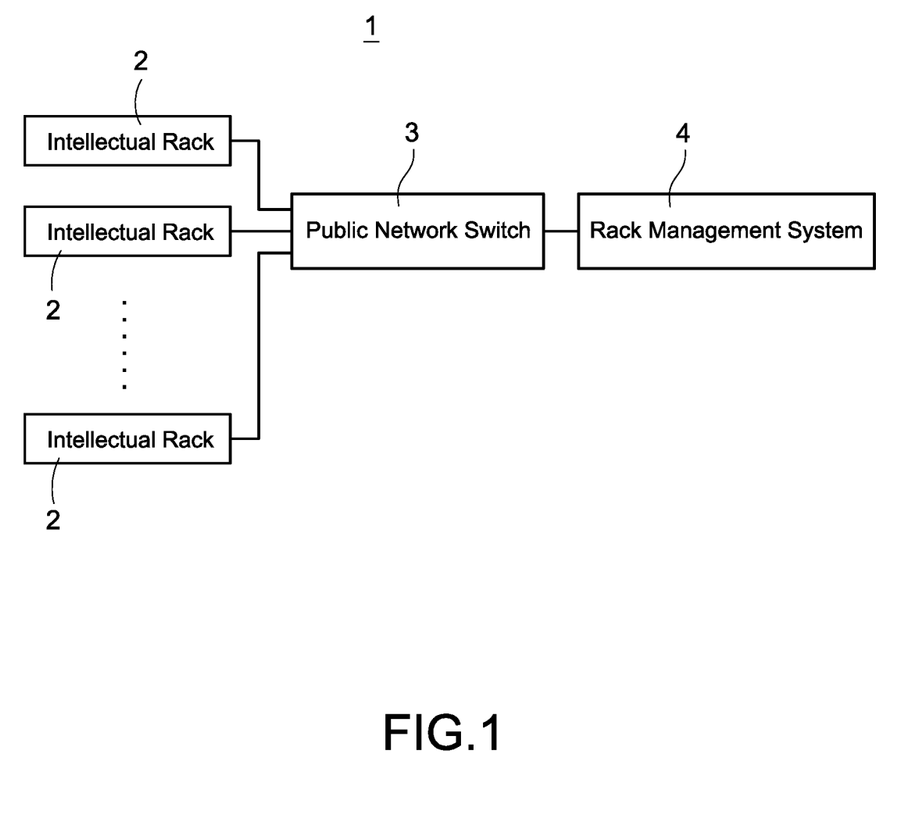
FIG. 1 is a schematic diagram of a rack system according to a first embodiment of the present invention.
Figure 2:
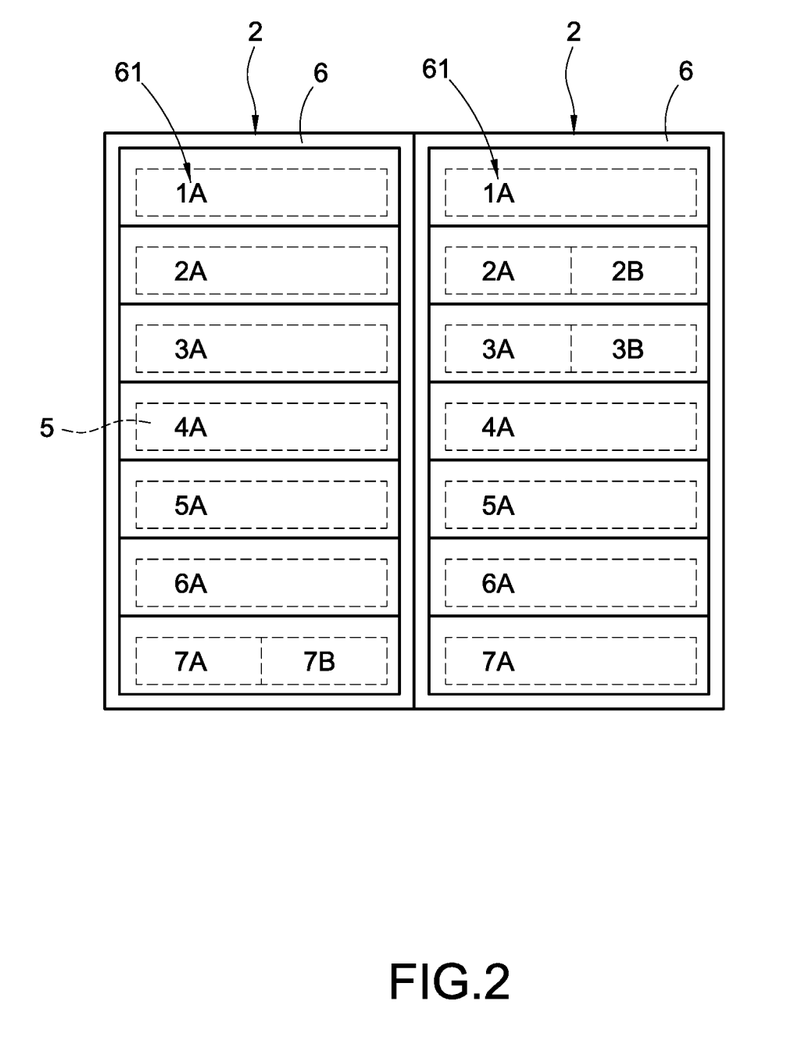
FIG. 2 is a schematic diagram of a rack according to the first embodiment of the preset invention.

Please refer to FIG. 1 and FIG. 2, FIG. 1 is a schematic diagram of a rack system according to a first embodiment of the present invention, and FIG. 2 is a schematic diagram of a rack according to the first embodiment of the preset invention. FIG. 1 discloses a rack system 1, the rack system 1 includes a plurality of intellectual racks 2 (referred to as a rack 2 hereinafter), a public network switch 3, and a rack management system 4. In one embodiment, the plurality of racks 2 of the rack system 1 is arranged in a data center, and the plurality of racks 2 are respectively connected to the public network switch 3. The rack management system 4 of the rack system 1 may be a server arranged at a remote end. The rack management system 4 may be connected with the public network switch 3 for monitoring and managing the plurality of racks 2 from the remote end through the Internet.

In other embodiment, the rack management system 4 may be a server arranged in the data center, and connected to each of the racks 2 directly through wired or wireless manners. In another embodiment, the rack management system 4 may be a server arranged directly in any of the racks 2 (for example, the rack management system 4 may be a server and inserted into a server slot of any one of the racks 2). In other words, the rack management system 4 of the present invention is not restricted as a remote-end server which connects to each of the racks 2 through the Internet.

As shown in FIG. 2, each rack 2 of the present invention may be arranged with a plurality of servers 5, and each of the servers 5 is respectively arranged in one server slot of the rack 2. The embodiment shown in FIG. 2 is exampled by two racks 2 in a data center and each rack 2 respectively arranged seven server slots, but not limited thereto. In this embodiment, each of the racks 2 respectively includes a shielding 6, and the shielding 6 has labelled with serial numbers 61 (as "1A" to "7A" as shown in FIG. 2) on positions respectively corresponding to each server slot, therefore, the serial numbers 61 may be used to indicate the positions corresponding to each of the servers 5 arranged in the rack 2 (the positions here are the physical arrangement positions of the servers 5, not the virtual positions in a computer).

In the present invention, each server slot may be used to arrange different types of server. In the embodiment shown in FIG. 2, six one-unit/one-node (1U1N) servers are respectively arranged in a first server slot to a sixth server slot of a first rack, and the serial numbers 61 labelled on the corresponding positions of the shielding 6 are "1A" to "6A". A one-unit/two-nodes (1U2N) server is arranged in a seventh server slot of the first rack, and the serial numbers 61 labelled on the corresponding positions of the shielding 6 are "7B" and "7B" (wherein, the two servers are respectively corresponding to a seventh server slot A-side and a seventh server slot B-side).

Besides, five one-unit/one-node servers are respectively arranged in a first server slot of a second rack and a fourth server slot to a seventh server slot of the second rack, and the serial numbers 61 labelled on the corresponding positions of the shielding 6 are "1A", and "4A" to "7A". Two one-unit/two-nodes servers are respectively arranged in a second server slot and a third server slot of the second rack, and the serial numbers 61 labelled on the corresponding positions of the shielding 6 are "2A", "2B", "3A", and "3B" (i.e., the four servers are respectively corresponding to a second server slot A-side, a second serer slot B-side, a third server slot A-side, and a third server slot B-side).

However, the above description is just one of the exemplary embodiments of the present invention, a management staff of the data center may adjust the types and the amounts of the servers arranged in each of the server slots and re-labels the serial numbers 61 upon the shielding 6 by demands, not limited in the aforementioned example.

For the sake of discussing the technical solution of the present invention, only one single rack 2 in the data center is taken as an example in the following paragraphs, and the rack management system 4 connected with the rack 2 through the public network switch 3 is also taken into the example in company with the rack 2, but not limited thereto.

Figure 3:
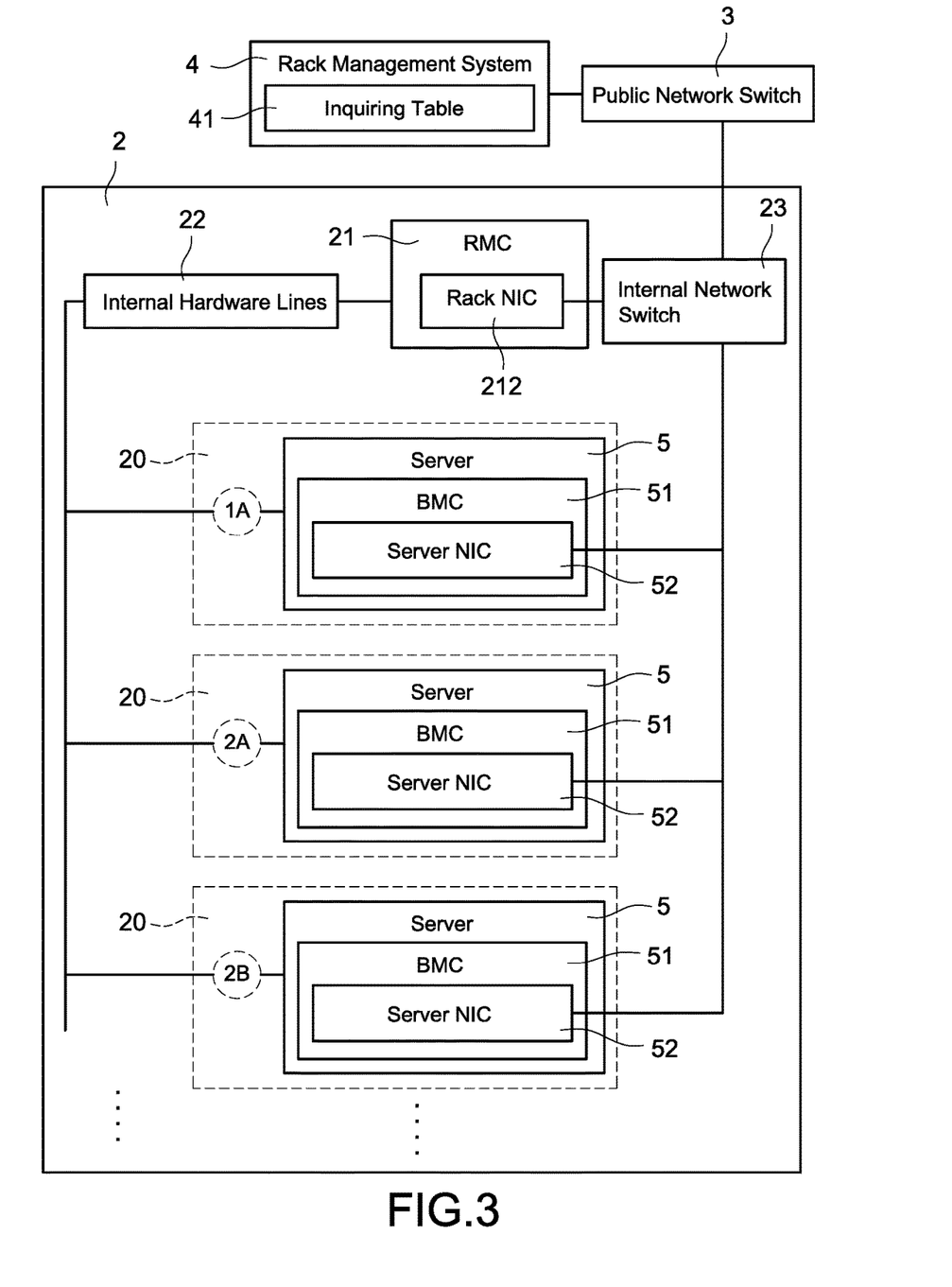
FIG. 3 is a block diagram of the rack according to the first embodiment of the present invention.

FIG. 3 is a block diagram of the rack according to the first embodiment of the present invention. In this embodiment, the rack 2 mainly includes a rack management controller (RMC) 21, a set of internal hardware lines 22, a plurality of server slots 20, and a plurality of servers 5.

As shown in FIG. 3, the RMC 21 of the rack 2 may connect with the rack management system 4 at a remote end through the public network switch 3. The rack management system 4 may connect with the RMC 21 in the rack 2 for communicating therewith, so as to monitor and manage the rack 2 and the plurality of servers 5 arranged in the rack 2.

In other embodiments, the rack management system 4 may be arranged directly inside the rack 2 (for example, the rack management system 4 may be one of the plurality of servers 5 arranged in any of the plurality of server slots 20), and connects with the RMC 21 directly.

The plurality of servers 5 are respectively arranged in each of the server slots 20, and each of the servers 5 respectively has a baseboard management controller (BMC) 51. The aforementioned RMC 21 and the BMCs 51 are common knowledge in this technical field, which is omitted here.

The RMC 21 may regularly detect the status of each server 5 in each server slot 20 through the set of internal hardware lines 22 (the status may be, for example, a serial number, a media access control address (MAC Address), an internet protocol address (IP Address), etc. of the BMC 51 of each server 5 in each server slot 20), and the RMC 21 may record the status in a baseboard management controller list (not shown in the Figs).

One of the mainly technical effects of the present invention is that the positions of the plurality of server slots 20 in the rack 2 are constant (i.e., each server slot 20 respectively has an absolutely position in the rack 2), and each of the server slots 20 is respectively pre-assigned with a binding IP address by the rack management system 4. If a server 5 in any of the server slots 20 has been replaced by a newly-replaced server (for example a management staff performs a replacing action on a server slot 1A, a server slot 2A, a server slot 2B, etc. as shown in FIG. 3), the rack management system 4 may obtain an IP address that is bound to the corresponding server slot (i.e., a target server slot of the replacing action) and assigns the obtained IP address to a BMC of the newly-replaced server 5, so as to replace the IP address currently used by the BMC of the newly-replaced server 5. Therefore, the rack 2 can automatically perform the IP address assignment due to the command sent from the rack management system 4, so as to reduce the work load of the management staff.

The set of internal hardware lines 22 is used to connect the RMC 21 to the plurality of server slots 20, thus the RMC 21 may connect to the BMCs 51 of each of the servers 5 arranged in each of the server slots 20. In the present invention, the rack 2 defines the positions of the plurality of server slots 20 (the constant positions which are unchangeable) through the set of internal hardware lines 22, and causes each position of each server slot 20 is independent and unique. Therefore, the RMC 21 may effectively confirm each server slot's 20 position through the set of internal hardware lines 22 and associates the status of each server 5 with the position of each corresponding server slot 20, and records these information in the aforementioned baseboard management controller list.

In this embodiment, when a first server is inserted into a first server slot A-side (1A), the rack management system 4 directly obtains an IP address binding to the first server slot A-side and assigns this IP address to the BMC of the first server.

In particular, the RMC 21 continually detects the status of the BMC of the server inside the first server slot A-side (1A) through the set of internal hardware lines 22, and records the detected status in the baseboard management controller list. The rack management system 4 may regularly communicate with the RMC 21 for reading the content of the baseboard management controller list. Whenever the rack management system 4 finds out that the server information recorded in the baseboard management controller list is changed (for example, the serial number, the MAC Address, or the IP address used by the BMC of the server on this position is changed), the rack management system 4 may determine that the server used to be inside the first server slot A-side (1A) has been replaced (for example, has been replaced by the aforementioned first server). Meanwhile, the rack management system 4 may obtain the IP address binding to the first server slot A-side, and assigns this IP address to the BMC of the first server to replace the IP address currently used by the BMC.

Similarly, when a second server is inserted into a second server slot A-side (2A), the rack management system 4 may directly obtain an IP address binding to the second server slot A-side (2A), and assigns this IP address to the BMC of the second server. When a third server is inserted into a second server slot B-side (2B), the rack management system 4 may directly obtain an IP address binding to the second server slot B-side, and assigns this IP address to the BMC of the third server.

When one of the plurality of servers 5 in the rack 2 is replaced by a new server (not shown) by the management staff, the rack management system 4 first confirms the position of the server slot 20 corresponding to the newly-replaced server through the RMC 21 and the set of internal hardware lines 22 (i.e., to read the aforementioned baseboard management controller list for confirming a target server slot of the replacing action of the newly-replaced server). Next, the rack management system 4 inquiries the IP address binding to the target server slot, and then assigns the IP address to the BMC of the newly-replaced server.

The aforementioned rack management system 4 may pre-store an inquiring table 41. In one embodiment, the inquiring table 41 records a relationship between the rack 2 and an IP address binding to the rack 2. In this embodiment, after the rack 2 boots, the rack management system 4 may assign the IP address binding to the rack 2 to the RMC 21 of the rack 2 after inquiring the inquiring table 41.

In other embodiment, the inquiring table 41 further records the relationship between the plurality of server slots 20 and a plurality of IP addresses respectively binding to each of the server slots 20. In this embodiment, the rack management system 4 may inquiry the inquiring table 41 based on the server slot 20 corresponding to the newly-replaced server (i.e., the target server slot of the replacing action), so as to obtain the IP address binding to the server slot 20 and assigns the obtained IP address to the BMC of the newly-replaced server.

By using the aforementioned technical solution, the present invention may ensure the rack 2 to assign IP addresses to the RMC 21 of the rack 2 and to the BMCs 51 of the servers 5 through a constant approach no matter how the servers 5 in the rack 2 are changing or replacing, therefore the work load of the management staff in the data center can be reduced, so as to avoid the mistake caused by manually assigning the IP addresses.

Please refer to FIG. 2 and FIG. 3 simultaneously. The rack 2 in the present invention further includes the shielding 6 for covering the RMC 21, the plurality of server slots 20, the plurality of servers 5, and the set of internal hardware lines 22 in the rack 2. If the rack management system 4 is arranged inside the rack 2, the shielding 6 may simultaneously cover the rack management system 4. Besides, the shielding 6 has labelled with serial numbers 61 on corresponding positions of each of the server slots 20, and each serial number 61 is respectively corresponding to the absolutely position of each server slot 20 inside the rack 2 which is defined by the set of internal hardware lines 22.

For example, if the set of internal hardware lines 22 defines the absolutely position of a first server slot A-side in the rack 2 as "1A", the management staff may label a serial number 61 as "1A" upon the corresponding position of the first server slot A-side on the shielding 6. Furthermore, the rack management system 4 may bind the position "1A" with a first IP address (such as 192.168.0.1) and records the binding relationship to the inquiring table 41. Similarly, if the set of internal hardware lines 22 defines the absolutely position of a second server slot A-side in the rack 2 as "2A", the management staff may label a serial number 61 as "2A" upon the corresponding position of the second server slot A-side in the shielding 6. Furthermore, the rack management system 4 may bind the position "2A" with a second IP address (such as 192.168.0.2) and records the binding relationship to the inquiring table 41.

In this embodiment, the rack 2 is connected with the public network switch 3, and connected to the rack management system 4 at a remote end through the public network switch 3. Therefore, the management staff may operate the rack management system 4 to monitor and manage the plurality of racks 2 in the data center from the remote end.

As shown in FIG. 3, the RMC 21 includes a rack network interface controller (NIC) 212, and each BMC 51 of each server 5 respectively includes a server NIC 52. In this embodiment, an internal network switch 23 is arranged inside the rack 2 and is used to internally connect with the rack NIC 212 and the server NICs 52 and to externally connect with the public network switch 3.

As mentioned above, the RMC 21 of the rack 2 and each BMC 51 of each server 5 may connect to the rack management system 4 at the remote end through the internal network switch 23 and the public network switch 3. After the RMC 21 and the BMCs 51 are respectively assigned with a corresponding IP address, the rack management system 4 may connect to the RMC 21 and each of the BMCs 51 from the remote end through the assigned IP addresses, so as to monitor and manage the rack 2 and each of the servers 5 in the rack 2.

Figure 4:
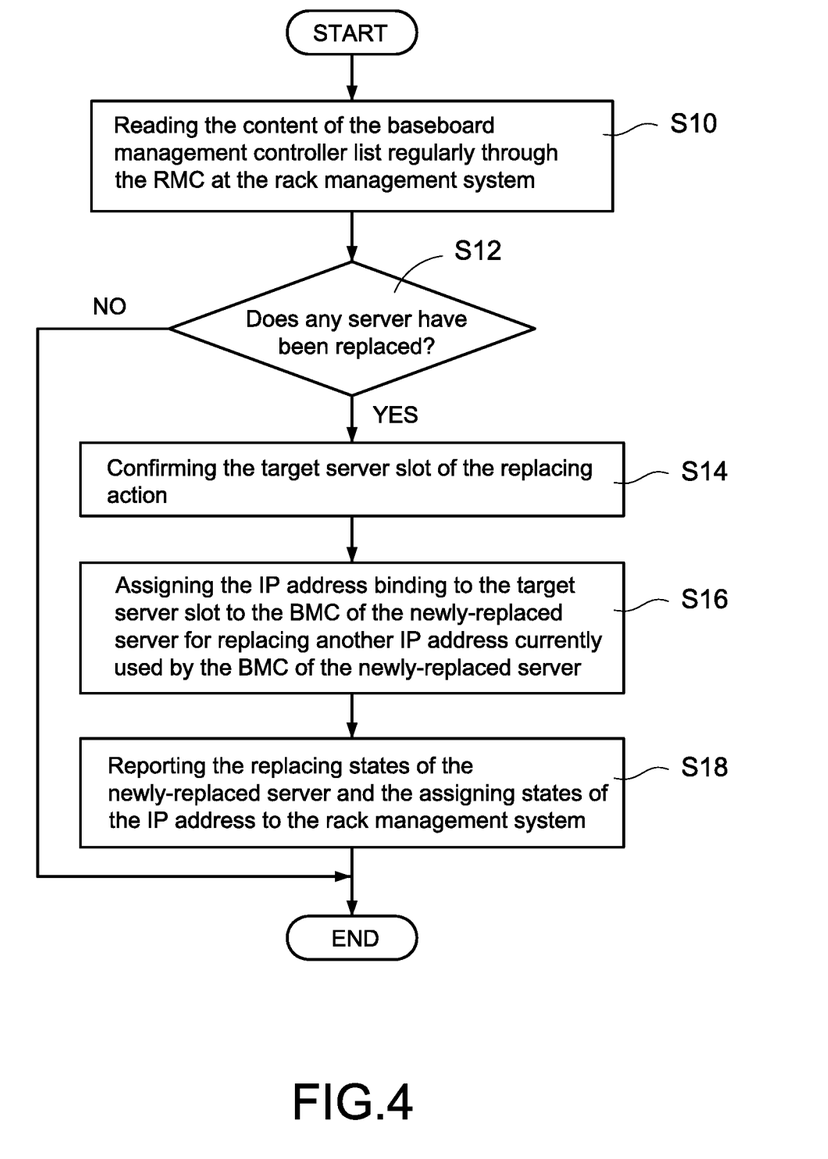
FIG. 4 is a managing flowchart according to the first embodiment of the present invention.

FIG. 4 is a managing flowchart according to the first embodiment of the present invention. FIG. 4 discloses an IP addresses managing method of the present invention, and the method is mainly adopted by the rack 2 disclosed in FIG. 1 to FIG. 3. In the embodiment, the RMC 21 of the rack 2 uses the IP address binding to the rack 2, and each BMC 51 of each server 5 respectively uses the IP address binding to each server slot 20 that is corresponding to each server 5.

After the rack 2 is activated by the management staff, the RMC 21 continually detects the status of each server 5 in each server slot 20 through the set of internal hardware lines 22 and records the detected status in the aforementioned baseboard management controller list. In particular, the baseboard management controller list may record tons of information, such as the number or the position of each server slot 20, and the serial number, the MAC address, the currently-used IP address of each server 5 in each server slot 20.

In the present invention, the rack management system 4 may communicate with the RMC 21 regularly for reading the content of the baseboard management controller list through the RMC 21 (step S10). Therefore, the rack management system 4 may determine whether the content of the baseboard management controller list is changed, so as to determine if any server 5 in the server slots 20 has been replaced or not (step S12).

In one embodiment, the rack management system 4 may retrieve the corresponding hardware information about each BMC of each server 5 from the baseboard management controller list (such as the serial number, the MAC address, etc.), and determines that the server 5 has been replaced whenever the hardware information is changed.

In another embodiment, the rack management system 4 may retrieve the IP address currently used by each BMC 51 of each server 5 from the baseboard management controller list, and also obtain the IP address bound to each server slot 20, therefore, the rack management system 4 may compare the IP address currently used by each BMC 51 with the IP address bound to each server slot 20, and determines that one server 5 in one server slot 20 has been replaced whenever a comparing result is unmatched.

If the rack management system 4 determines negative in the step S12 (i.e., the hardware information doesn't change, or the currently used IP address is the same as the bound IP address), then the rack management system 4 terminates the method of the present invention. Besides, the rack management system 4 may continually communicate with the RMC 21 for obtaining the newest baseboard management controller list while the rack 2 is working, and the RMC 21 may detect the status of each server 5 in each server slot 20 through the set of internal hardware lines 22 and electrical signals for the rack management system 4 to get the newest content of the baseboard management controller list.

If the rack management system 4 determines positive in the step S12, then the rack management system 4 confirms the target server slot of the replacing action (step S14), and obtains the IP address binding to the target server slot.

In the step S14, the rack management system 4 is to directly confirm the replacing position of a newly-replaced server (such as a first server slot A-side (1A), a second server slot A-side (2A), a second server slot B-side (2B), etc. as shown in FIG. 3) based on the content of the baseboard management controller list, i.e., to confirm which server slot is the target server slot of the replacing action. Next, the rack management system 4 inquiries the inquiring table 41 according to the target server slot for obtaining the IP address binding to the target server slot. Finally, the rack management system 4 assigns the IP address binding to the target server slot to the BMC 51 of the newly-replaced server 5, so as to replace another IP address currently used by the BMC 51 of the newly-replaced serer 5 by the IP address binding to the target server slot (step S16).

In this embodiment, the RMC 21 assumed that the BMC 51 of the newly-replaced server 5 already has an IP address (i.e., the currently used IP address as mentioned above). When the newly-replaced server 5 is inserted into any one of the server slots 20, the RMC 21 may initiate a communication with the newly-replaced server 5 through the IP address currently used by the BMC 51 of the newly-replaced server 5, and then performs an assigning procedure for assigning the binding IP address to the newly-replaced server 5 according to the command sent from the rack management system 4 (i.e., to replace the IP address currently used by the BMC 51 of the newly-replaced server 5 by the IP address binding to the target server slot).

Finally, the RMC 21 may optionally report the replacing states of the newly-replaced server and the assigning states of the IP address to the rack management system 4 (step S18).

By using the above technical solution, the present invention may ensure that no matter which server slot 20 is the target server slot of a newly-replaced server 5 to be inserted in, the newly-replaced server 5 can always be assigned with an IP address binding to the target server slot 20 after being inserted into the target server slot 20.

Figure 5A:
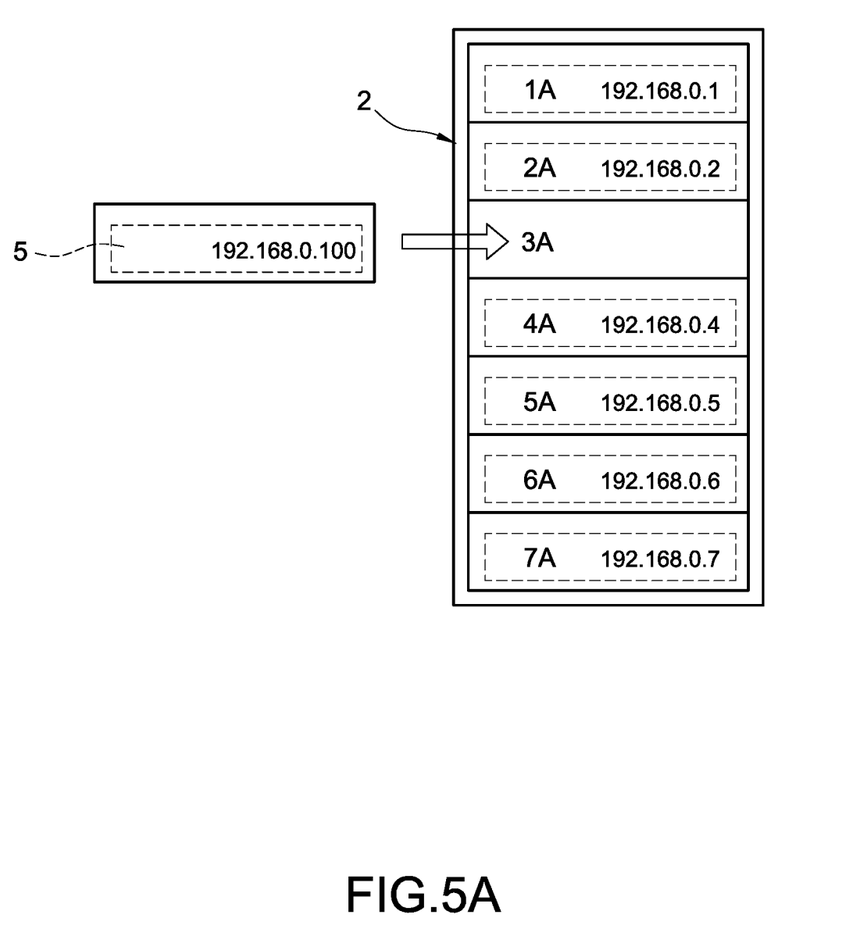
FIG. 5A is a schematic diagram before changing a server according to the first embodiment of the present invention.
Figure 5B:
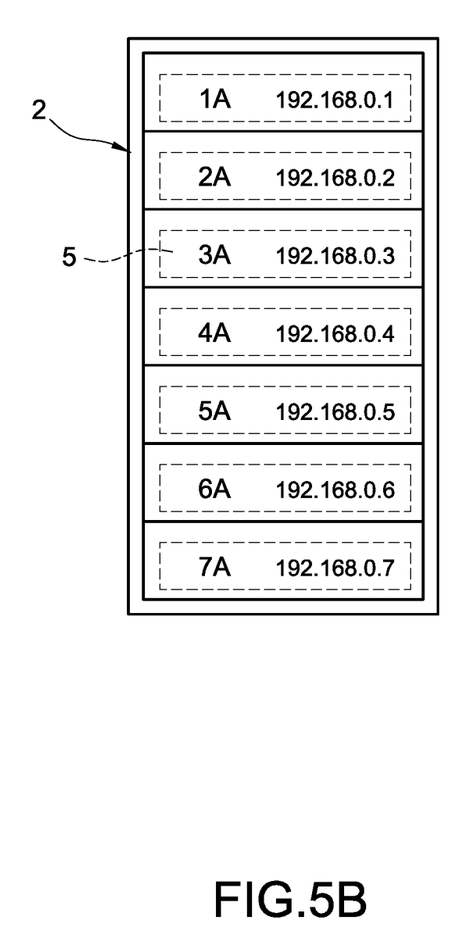
FIG. 5B is a schematic diagram after changing the server according to the first embodiment of the present invention.

FIG. 5A is a schematic diagram before changing a server according to the first embodiment of the present invention. FIG. 5B is a schematic diagram after changing the server according to the first embodiment of the present invention. In this embodiment, each server slot 20 of the rack 2 is respectively bound with an IP address. In particular, a first IP address (such as 192.168.0.1) is bound to a first server slot A-side (1A), a second IP address (such as 192.168.0.2) is bound to a second server slot A-side (2A), a third IP address (such as 192.168.0.3) is bound to a third server slot A-side (3A), a fourth IP address (such as 192.168.0.4) is bound to a fourth server slot A-side (4A), and so on, by the rack 2 in advance, according to the command sent from the rack management system 4.

In the embodiment shown in FIG. 5A, the management staff is inserting a newly-replaced server to the third server slot A-side (3A) of the rack 2, and the BMC of the newly-replaced server already has another IP address (such as 192.168.0.100 in FIG. 5A) before being inserted into the rack 2.

In particular, after the newly-replaced server is inserted into the corresponding server slot, the BMC of the newly-replaced server needs to first communicate with the RMC 21 of the rack 2 before performing the confirming and binding action of the IP address. In other words, the RMC 21 must have the ability to recognize the IP address currently used by the BMC of the newly-replaced server. In the embodiment shown in FIG. 5A, the IP address currently used by the BMC of the newly-replaced server is at the same network segment as the IP addresses used by other servers in the rack 2 (for example, 192.168.0.x). However, if the BMC of the newly-replaced server can communicate with the RMC 21 through network, the IP address currently used by the BMC of the newly-replaced server is unnecessary to be at the same network segment as the IP addresses used by other servers.

As shown in FIG. 5B, after the newly-replaced server is inserted into the rack 2, the rack management system 4 may detect and confirm that the newly-replaced server is inserted into a third server slot A-side (3A) through the RMC 21 and the set of internal hardware lines 22 (i.e., the rack management system 4 inquires the baseboard management controller list and finds out that the server used to be in the third server slot A-side (3A) has been replaced). Therefore, the rack management system 4 may obtain a third IP address (such as 192.168.0.3 in this embodiment) binding to the third server slot A-side (3A) after inquiring the inquiring table 41, and assigns the third IP address to the BMC of the newly-replaced server to replace the IP address currently used by the BMC by the third IP address.

Therefore, even if the server used to be in the third server slot A-side (3A) has been replaced, the management staff can directly operate the rack management system 4 to connect to the newly-replaced server in the third server slot A-side (3A) through the third IP address (i.e., 192.168.0.3) to monitor and manage the newly-replaced server without manually re-assigning the IP address for the newly-replaced server, which is very convenient.

For the purpose of automatically assigning the IP address to the newly-replaced server in the rack 2, the rack 2 of the present invention needs to perform a binding procedure of the IP addresses in advance before any of the servers 5 in the rack 2 is replaced.

Figure 6:
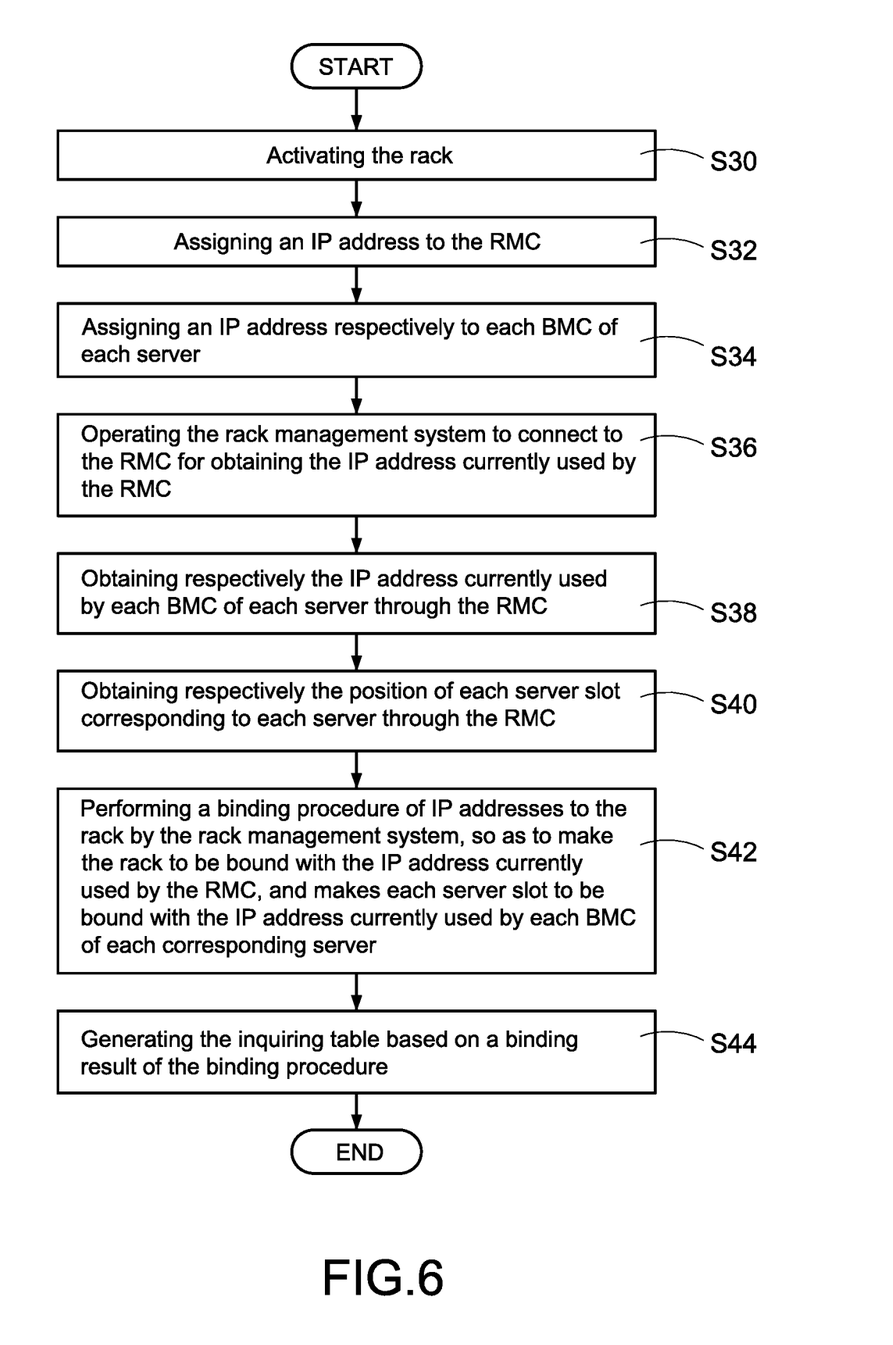
FIG. 6 is a managing flowchart according to a second embodiment of the present invention.

Please refer to FIG. 6, which is a managing flowchart according to a second embodiment of the present invention. FIG. 6 is used to detailed describe the aforementioned binding procedure of the IP addresses.

First, the management staff activates the rack 2 of the present invention (step S30), wherein the rack 2 is already arranged with the RMC 21, and each of the server slots 20 in the rack 2 is respectively arranged with a corresponding server 5. Next, the rack 2 may assign an IP address to the RMC 21 through manual operation by the management staff or through command sent from the rack management system 4 (step S32), and also assigns IP addresses respectively to each BMC 51 of each server 5 (step S34).

After the IP addresses of the RMC 21 and the BMCs 51 are assigned completely, the management staff may operate the rack management system 4 to connect to the RMC 21 of the rack 2, and obtain the IP address currently used by the RMC 21 (step S36).

Next, the rack management system 4 may respectively obtain the IP address currently used by each BMC 51 of each server 5 through the RMC 21 (step S38), and also respectively obtains the position of each server slot 20 corresponding to each server 5 (step S40). It should be mentioned that the rack management system 4 may connect to the rack 2 from a remote end through the Internet, or may connect to the rack 2 directly through wired manners, not limited thereto.

In one embodiment, the rack management system 4 may connect to the rack 2 through the public network switch 3. After obtaining the IP addresses of the RMC 21 and the BMCs 51, the rack management system 4 may connect to the RMC 21 and each BMC 51 of each server 5 through the public network switch 3 and the aforementioned internal network switch 23.

In particular, after connecting to the RMC 21, the rack management system 4 may obtain the IP address of each BMC 51 of each server 5 and the position of each server slot 20 corresponding to each server 5 simultaneously by the RMC 21, that is to say, the above step S38 and step S40 do not have a constant execution order.

Next, the rack management system 4 may perform a binding procedure to the rack 2 according to the operation of the management staff, so as to make the rack 2 to be bound with the IP address currently used by the RMC 21 of the rack 2, and makes each server slot 20 to be bound with the IP address currently used by each BMC 51 of each corresponding server 5 (step S42).

After the binding procedure is performed completely, the rack management system 4 may further generate the aforementioned inquiring table 41 based on a binding result of the binding procedure (step S44). Therefore, the inquiring table 41 will be recording with a relationship between the rack 2 and the IP address binding to the rack 2. Therefore, no matter how the servers 5 in the rack 2 are replaced, the RMC 21 of the rack 2 can always be assigned and uses the IP address binding to the rack 2.

Besides, after the step S44, the inquiring table 41 will be recording a relationship between the plurality of server slots 20 and the IP addresses respectively binding to each of the server slots 20. Therefore, no matter how the servers 5 in the server slots 20 are replaced, the BMC 51 of a newly-replaced server 5 can always be assigned and uses the IP address binding to the corresponding server slot 20 where the newly-replaced server 5 is inserted in.

By using the aforementioned technical solution, the present invention can keep the binding effect between each position (including the position of the rack 2 and the positions of the server slots 20) and each IP address, so as to achieve the purpose of overall maintenance and protection for the IP addresses of all racks and all servers in the data center.

As the skilled person will appreciate, various changes and modifications can be made to the described embodiment. It is intended to include all such variations, modifications and equivalents which fall within the scope of the present invention, as defined in the accompanying claims.

What is claimed is:

1. An intellectual rack, comprising:
    a rack management controller (RMC);
    a rack management system, arranged to connect with the RMC;
    a plurality of server slots;
    a plurality of servers, respectively arranged in each of the server slots and respectively having a baseboard management controller (BMC); and
    a set of internal hardware lines, arranged to define positions of the plurality of server slots respectively, and arranged to connect the RMC with each of the servers arranged in each of the server slots;
    wherein, the rack management system is configured to confirm one of the server slots that corresponds to a new server through the RMC and the set of internal hardware lines when one of the plurality of servers has been replaced by the new server, and the rack management system is configured to inquire an internet protocol (IP) address binding to the server slot that corresponds to the new server and assigns the IP address to the BMC of the new server to replace another IP address currently used by the BMC of the new server.

2. The intellectual rack in claim 1, wherein the rack management system is configured to store an inquiring table, the inquiring table is configured to record a relationship between the intellectual rack and an IP address binding to the intellectual rack, wherein the RMC is assigned and uses the IP address binding to the intellectual rack.

3. The intellectual rack in claim 1, wherein the rack management system is configured to store an inquiring table, the inquiring table is configured to record a relationship between the plurality of server slots and a plurality of IP addresses respectively binding to each of the server slots, wherein, the rack management system is configured to inquire the inquiring table according to the server slot that corresponds to the new server for obtaining the IP address binding to the server slot that corresponds to the new server.

4. The intellectual rack in claim 3, further comprising a shielding, arranged to cover the RMC, the plurality of server slots, the plurality of servers, and the set of internal hardware lines, wherein the shielding has serial numbers respectively labelled on each position corresponding to each of the server slots, and each serial number is respectively corresponding to an absolutely position of each of the server slots in the intellectual rack defined by the set of internal hardware lines.

5. The intellectual rack in claim 4, wherein the RMC comprises a rack network interface controller (NIC), each BMC of each server respectively comprises a server network interface controller (NIC), the intellectual rack further comprises an internal network switch, the RMC is arranged to connect to the internal network switch through the rack NIC, and each BMC of each server is respectively arranged to connect to the internal network switch through the server NIC, and the RMC and the BMCs are arranged to connect to the rack management system through the internal network switch.

6. An IP addresses managing method used by the intellectual rack in claim 1, comprising following steps:
    a) reading a baseboard management controller list through the RMC by the rack management system, wherein the baseboard management controller list is configured to record a serial number, a media access control (MAC) address or an internet protocol (IP) address of each of the BMCs;

b) determining whether each of the server arranged in each of the server slots has been replaced by the new server according to a content of the baseboard management controller list;
c) confirming one of the server slots that corresponds to the new server when determining that one of the servers has been replaced by the new server;
d) inquiring the IP address binding to the server slot that corresponds to the new server by the rack management system following the step c); and
e) replacing another IP address currently used by the BMC of the new server by the IP address binding to the server slot that corresponds to the new server following the step d).

7. The IP addresses managing method in claim 6, wherein the step b) is to determine that one of the servers has been replaced when determining the serial number or the MAC address of the BMC of any of the servers is changed due to the baseboard management controller list, or determining the IP address currently used by the BMC of a specific server is unmatched with the IP address binding to one of the server slots that corresponds to the specific server due to the baseboard management controller list.

8. The IP addresses managing method in claim 6, wherein the rack management system is configured to store an inquiring table, the inquiring table is configured to record a relationship between the plurality of server slots and a plurality of IP addresses respectively binding to each of the server slots, wherein the step d) is to inquire the inquiring table according to the server slot that corresponds to the new server for obtaining the IP address binding to the server slot that corresponds to the new server by the rack management system.

9. The IP addresses managing method in claim 6, wherein the intellectual rack further comprises a shielding for covering the RMC, the plurality of server slots, the plurality of servers, and the set of internal hardware lines, and the shielding has serial numbers respectively labelled on each position corresponding to each of the server slots, and each serial number is respectively corresponding to an absolutely position of each of the server slots in the intellectual rack defined by the set of internal hardware lines.

10. The IP addresses managing method in claim 6, further comprising following steps before the step a):
    a01) activating the intellectual rack;
    a02) respectively assigning an IP address to the RMC and each BMC of each of the servers;
    a03) connecting to the RMC of the intellectual rack through the rack management system;
    a04) obtaining the IP address currently used by the RMC by the rack management system;
    a05) obtaining each IP address currently used by each BMC of each server and the server slots that respectively correspond to each of the servers through the RMC by the rack management system;
    a06) performing a binding procedure of the IP addresses to the intellectual rack by the rack management system for making the IP address currently used by the RMC to be bound to the intellectual rack and making each IP address currently used by each BMC of each server to be bound to each of the server slots that respectively corresponds to each of the servers; and
    a07) generating an inquiring table according to a binding result of the binding procedure after the step a06), wherein the inquiring table is configured to record a relationship between the intellectual rack and the IP address binding to the intellectual rack, and configured to record a relationship between the plurality of server slots and the plurality of IP addresses respectively binding to each of the server slots.

\* \* \* \* \*